United States Patent
Ohashi et al.

(10) Patent No.: US 10,077,948 B2
(45) Date of Patent: Sep. 18, 2018

(54) HEAT STORAGE APPARATUS AND METHOD OF USING THE SAME

(71) Applicant: TOYOTA JIDOSHA KABUSHIKI KAISHA, Toyota-shi, Aichi-ken (JP)

(72) Inventors: Yoshio Ohashi, Susono (JP); Masaki Watanabe, Shizuoka-ken (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 175 days.

(21) Appl. No.: 15/286,034

(22) Filed: Oct. 5, 2016

(65) Prior Publication Data

US 2017/0102191 A1   Apr. 13, 2017

(30) Foreign Application Priority Data

Oct. 9, 2015  (JP) ................................ 2015-200894

(51) Int. Cl.
| | |
|---|---|
| *F28D 20/00* | (2006.01) |
| *F28F 27/02* | (2006.01) |
| *B60K 6/00* | (2006.01) |
| *C09K 5/00* | (2006.01) |
| *F28D 21/00* | (2006.01) |

(52) U.S. Cl.
CPC ............ *F28D 20/0039* (2013.01); *B60K 6/00* (2013.01); *C09K 5/00* (2013.01); *F28D 20/0034* (2013.01); *F28F 27/02* (2013.01); *F28D 2020/0082* (2013.01); *F28D 2021/008* (2013.01); *F28D 2021/0028* (2013.01)

(58) Field of Classification Search
CPC ............ F28D 20/0039; F28D 20/0034; F28D 2020/0082; F28F 27/02

USPC ......................................................... 165/51
See application file for complete search history.

(56) References Cited

U.S. PATENT DOCUMENTS

2015/0000277 A1 * 1/2015 Reynolds ............... F03G 6/067
                                                            60/641.15

FOREIGN PATENT DOCUMENTS

| JP | 10-325617 A | 12/1998 | |
|---|---|---|---|
| JP | 2014-181879 A | 9/2014 | |
| JP | 2015160899 | * 9/2015 | ........... Y02E 60/145 |

OTHER PUBLICATIONS

English translation of JP201560899.*

* cited by examiner

*Primary Examiner* — Jianying Atkisson
*Assistant Examiner* — Joel Attey
(74) *Attorney, Agent, or Firm* — Sughrue Mion, PLLC (57) ABSTRACT

A heat storage apparatus includes: a first tank; a second tank that is provided above the first tank; an on-off valve; and a heat storage solution that is accommodated in the first tank and the second tank. The heat storage solution has a characteristic of absorbing heat and separating into a first liquid and a second liquid having a lower density than the first liquid at a lower critical solution temperature or higher, the first liquid and the second liquid have a characteristic of releasing heat and mixing with each other at a temperature lower than the lower critical solution temperature, and when the heat storage solution separates into the first liquid and the second liquid, the first liquid is accommodated in the first tank and the second liquid is accommodated in the second tank.

6 Claims, 5 Drawing Sheets

HEAT STORAGE APPARATUS AND METHOD OF USING THE SAME

INCORPORATION BY REFERENCE

The disclosure of Japanese Patent Application No. 2015-200894 filed on Oct. 9, 2015 including the specification, drawings and abstract is incorporated herein by reference in its entirety.

BACKGROUND

1. Technical Field

The present disclosure relates to a heat storage apparatus and a method of using the same. In particular, the disclosure relates to a heat storage apparatus in which a heat storage solution absorbs and releases heat in a state of being liquid, and a method of using the same.

2. Description of Related Art

Representative examples of a heat storage apparatus include a latent heat storage apparatus and a chemical heat storage apparatus.

A latent heat storage apparatus uses heat generated during a phase change. For example, latent heat of solidification generated during liquid solidification is used. Examples of a heat storage material include paraffin and a metal salt.

A chemical heat storage apparatus uses heat generated during a chemical reaction. For example, heat generated during a hydroxide-forming reaction of an oxide and water vapor is used. Examples of a heat storage material include an oxide, a hydrate, and a carbonate.

As a chemical heat storage apparatus, for example, Japanese Patent Application Publication No. 2014-181879 (JP 2014-181879 A) discloses an apparatus in which a chemical heat storage material capable of reversibly undergoing a hydration reaction and a dehydration reaction is used.

In the apparatus disclosed in JP 2014-181879 A, it is necessary to use an evaporation condenser which generates water vapor used for the hydration reaction of the chemical heat storage material and condenses water vapor generated by the dehydration reaction of the hydrated chemical heat storage material.

As a heat storage apparatus similar to a chemical heat storage apparatus, for example, Japanese Patent Application Publication No. 10-325617 (JP 10-325617 A) discloses a heat storage apparatus using the heat of mixing generated when two kinds of liquids are mixed with each other. In this heat storage apparatus, a mixed solution is fractionated after releasing heat in order to return the state of the mixed solution to a heat-releasable state.

SUMMARY

In the heat storage apparatus disclosed in 2014-181879 A, the apparatus that evaporates and condenses water is necessary. In the heat storage apparatus disclosed in JP 10-325617 A, an apparatus that evaporates and fractionates a mixed solution is necessary.

That is, the present inventors found that the heat storage apparatus disclosed in JP 2014-181879 A and the heat storage apparatus disclosed in JP 10-325617 A have a problem in that the size thereof is large because evaporation and condensation, or evaporation and fractional distillation are necessary to return the state of water or a mixed solution to a heat-releasable state.

The disclosure provides: a heat storage apparatus in which an evaporation condenser or an evaporation fractionator for returning the state of water or a mixed solution to a heat-releasable state is not necessary; and a method of using the same.

According to a first aspect of the disclosure, there is provided a heat storage apparatus including: a first tank; a second tank that is provided above the first tank; an on-off valve having one end connected to an upper portion of the first tank and having another end connected to a lower portion of the second tank; and a heat storage solution that is accommodated in the first tank and the second tank. The heat storage solution has a characteristic of absorbing heat and separating into a first liquid and a second liquid having a lower density than the first liquid at a lower critical solution temperature or higher, the first liquid and the second liquid have a characteristic of releasing heat and mixing with each other at a temperature lower than the lower critical solution temperature, and when the heat storage solution separates into the first liquid and the second liquid, the first liquid is accommodated in the first tank and the second liquid is accommodated in the second tank.

The first liquid may be a tetra-n-butylphosphonium trifluoromethanesulfonyl leucine aqueous solution, and the second liquid may be water.

A heat release pipe filled with a heating medium may be provided at least in the first tank or in the second tank.

A heat absorption pipe filled with a heating medium may be provided at least in the first tank or in the second tank.

The heat release pipe may be connected to a battery of a hybrid vehicle.

The heat absorption pipe may be connected to an internal combustion engine of a hybrid vehicle.

According to a second aspect of the disclosure, there is provided a method of using the above-described heat storage apparatus, the method including: a) opening the on-off valve at a lower critical solution temperature or higher to obtain a heat storage state in which the first liquid is accommodated in the first tank and the second liquid is accommodated in the second tank, and then closing the on-off valve to maintain the heat storage state; and b) opening the on-off valve at a temperature lower than the lower critical solution temperature such that the heat storage state is changed to start heat release.

According to the disclosure, a heat storage apparatus in which an evaporation condenser or an evaporation fractionator for returning the state of water or a mixed solution to a heat-releasable state is not necessary, and a method of using the same can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of a heat storage apparatus according to the disclosure will be described in detail. The disclosure is not limited to the following embodiments.

Figure 1:
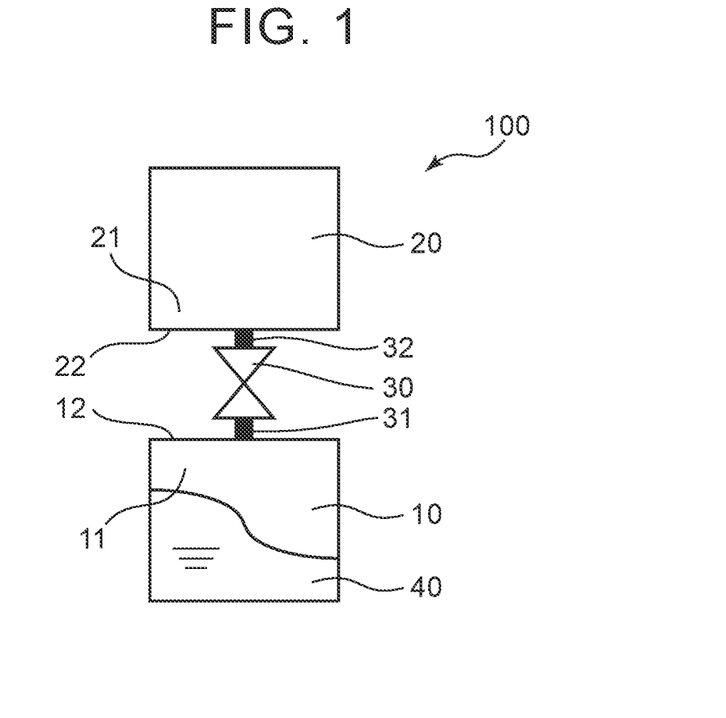
FIG. 1 is a schematic diagram showing an example of an embodiment of a heat storage apparatus according to the disclosure.

FIG. 1 is a schematic diagram showing a heat storage apparatus 100 according to an embodiment of the disclosure.

The heat storage apparatus 100 includes a first tank 10, a second tank 20, an on-off valve 30, and a heat storage solution 40.

(First Tank)

The heat storage apparatus 100 includes the first tank 10. The first tank 10 accommodates the heat storage solution 40 described below. A material of the first tank 10 is not particularly limited as long as it is not corroded by the heat storage solution 40. The volume of the first tank 10 will be described below.

(Second Tank)

The second tank 20 is provided above the first tank 10 in the gravity direction. As a result, when the heat storage solution 40 separates into two liquids, a liquid having a high density is accommodated in the first tank 10, and a liquid having a low density is accommodated in the second tank 20. The details will be described below. A material of the second tank 20 is as described above regarding the first tank 10. The volume of the second tank 20 will be described below.

(On-Off Valve)

The on-off valve 30 has one end 31 connected to an upper portion 11 of the first tank 10 and has another end 32 connected to a lower portion 21 of the second tank 20. The operation of the on-off valve 30 will be described below.

Figure 2:
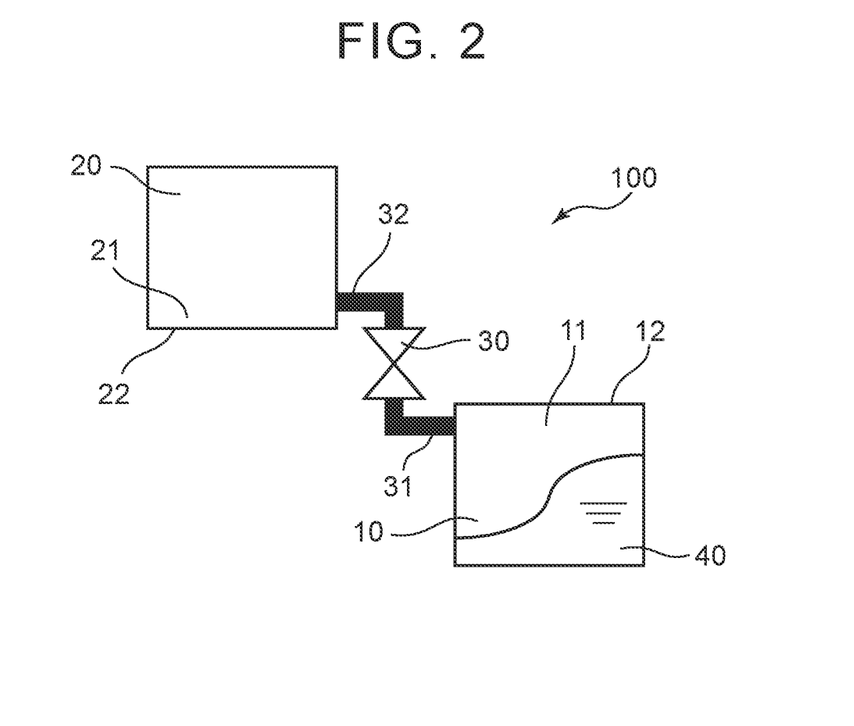
FIG. 2 is a schematic diagram showing another embodiment of the heat storage apparatus according to the disclosure.

The upper portion 11 includes a region of the first tank 10 near an upper end 12. Likewise, the lower portion 21 includes a region of the second tank 20 near a lower end 22. FIG. 2 is a schematic diagram showing another embodiment of the heat storage apparatus. As shown in FIG. 2, the end 31 of the on-off valve 30 may be connected to the upper portion 11 which is the region near the upper end 12. Likewise, the end 32 of the on-off valve 30 may be connected to the lower portion 21 which is the region near the lower end 22. A temperature detector for detecting a temperature of the heat storage solution 40 may be provided in the first tank 10 such that the on-off valve 30 is opened or closed based on the detected temperature. That is, a temperature detected by the temperature detector may be input to an ECU such that the opening and closing of the on-off valve 30 is controlled based on the detected temperature. The on-off valve 30 may be a stand-alone valve that is opened and closed in response to the input of the temperature of the heat storage solution 40.

(Heat Storage Solution)

The heat storage solution 40 is accommodated in the first tank 10 and the second tank 20. The heat storage solution 40 has a characteristic of absorbing heat and separating into the first liquid and the second liquid at a lower critical solution temperature or higher, and the first liquid and the second liquid have a characteristic of releasing heat and mixing with each other at a temperature lower than the lower critical solution temperature. The heat storage solution 40 is not particularly limited as long as the density of the first liquid is higher than that of the second liquid.

The state of the heat storage solution 40 varies depending on the lower critical solution temperature (LCST).

At the lower critical solution temperature or higher, the heat storage solution 40 separates into the first liquid and the second liquid, and the first liquid and the second liquid are not mixed with each other. Since the first liquid has a higher density than the second liquid, a layer of the second liquid is formed on a layer of the first liquid.

On the other hand, at a temperature lower than the lower critical solution temperature, the first liquid and the second liquid separated from the heat storage solution 40 are mixed with each other. At the lower critical solution temperature or higher, the layer of the second liquid is formed on the layer of the first liquid due to the difference in density; however, at a temperature lower than the lower critical solution temperature, the first liquid and the second liquid are mixed with each other.

During the phase change of the heat storage solution 40 depending on the lower critical solution temperature, heat is released and absorbed. That is, in a case where the heat storage solution 40 is in the mixed state at the lower critical solution temperature or higher, the heat storage solution 40 separates into the first liquid and the second liquid while the heat storage solution 40 absorbs heat. The heat storage solution 40 reaches a heat storage state. On the other hand, when the heat storage solution 40 is in the heat storage state of separating into the first liquid and the second liquid and is at a temperature lower than the lower critical solution temperature, the first liquid and the second liquid releases heat and are mixed with each other. In this specification, the heat storage state refers to the state where the heat storage solution 40 separates into the first liquid and the second liquid.

Table 1 shows examples of a combination of the first liquid and the second liquid of the above-described heat storage solution 40 in the heat storage state. In Table 1, "%" represents "mass %".

TABLE 1

| Combination | Liquid | Name of Material | Density (g/cm$^3$) | Lower Critical Solution Temperature (° C.) |
|---|---|---|---|---|
| 1 | First Liquid | 70% Tetra-n-Butylphosphonium Trifluoromethanesulfonyl Leucine Aqueous Solution | 1.04 | 22 |
|  | Second Liquid | Water | 1.00 |  |
| 2 | First Liquid | 70% Tetra-n-Butylphosphonium Trifluoromethanesulfonyl Leucine Aqueous Solution | 1.04 | 28 |
|  | Second Liquid | 5% Ethanol Aqueous Solution | 0.99 |  |

TABLE 1-continued

| Combination | Liquid | Name of Material | Density (g/cm³) | Lower Critical Solution Temperature (° C.) |
|---|---|---|---|---|
| 3 | First Liquid | 70% Tetra-n-Butylphosphonium Trifluoromethanesulfonyl Leucine Aqueous Solution | 1.04 | 16 |
|  | Second Liquid | 5% 1-Butanol Aqueous Solution | 0.99 |  |
| 4 | First Liquid | 70% Tetra-n-Butylphosphonium Trifluoroacetate Aqueous Solution | 1.02 | 30 |
|  | Second Liquid | Water | 1.00 |  |
| 5 | First Liquid | 70% Tetra-n-Butylphosphonium Trifluoromethanesulfonyl Isoleucine Aqueous Solution | 1.04 | 22 |
|  | Second Liquid | Water | 1.00 |  |
| 6 | First Liquid | 60% Tetra-n-Butylammonium-2,4,6-Trimethylbenzenesulfonate Aqueous Solution | 1.02 | 52 |
|  | Second Liquid | Water | 1.00 |  |
| 7 | First Liquid | 30% Tetra-n-Butylammonium Bromide Toluene Solution | 0.90 | 24 |
|  | Second Liquid | Toluene | 0.87 |  |

Regarding the heat storage solution 40 in the heat storage state, only a condition that the first liquid and the second liquid are at a temperature lower than the lower critical solution temperature is not sufficient for the first liquid and the second liquid to release heat and to mix with each other. That is, it is necessary that the first liquid and the second liquid, which are separated from each other, are mutually transferable in contact with each other.

Conversely, in order for the first liquid and the second liquid not be mixed with each other and not to start heat release even when the heat storage solution 40 in the heat storage state is at a temperature lower than the lower critical solution temperature, it is necessary that the first liquid and the second liquid, which are separated from each other, are not in contact with each other and are not mutually transferable.

In the heat storage apparatus 100, the heat storage solution 40 can absorb or release heat by satisfying the following relationship between the first tank 10 and the second tank 20 and the following relationship between the first liquid and the second liquid.

(Relationship Between First Tank and Second Tank and Relationship Between First Liquid and Second Liquid)

A relationship between the first tank 10 and the second tank 20 and a relationship between the first liquid and the second liquid are determined based on the state where the heat storage solution 40 separates into the first liquid and the second liquid, that is, based on the heat storage state of the heat storage solution 40.

As described above, the density of the first liquid is higher than that of the second liquid. Accordingly, when the heat storage solution 40 is in the heat storage state in a state where the on-off valve 30 is opened, the first liquid is accommodated in the first tank 10, and the second liquid is accommodated in the second tank 20.

With this configuration, even in a case where the heat storage solution 40 is at a temperature lower than the lower critical solution temperature, the first liquid and the second liquid are not mixed with each other by closing the on-off valve 30. As a result, heat release is not started. On the other hand, by opening the on-off valve 30, the first liquid and the second liquid freely transfer through the on-off valve 30 such that heat release is started.

When the heat storage solution 40 is in the heat storage state, in a case where the first liquid is accommodated in the first tank 10 and the second liquid is accommodated in the second tank 20, heat release is not started even when the heat storage solution 40 is at the lower critical solution temperature or higher after the on-off valve 30 is closed. Here, the first liquid being accommodated in the first tank 10 means that the second liquid is not present in the first tank 10 or that a small amount of the second liquid having no effect on heat release is present in the first tank 10. Here, the second liquid being accommodated in the second tank 20 means that the first liquid is not present in the second tank 20 or that a small amount of the first liquid having no effect on heat release is present in the second tank 20.

When the heat storage solution 40 is in the heat storage state, a space may be present above the second liquid in the second tank 20. Even when the on-off valve 30 is opened at a temperature lower than the lower critical solution temperature, the space has no effect on the mixing of the first liquid and the second liquid.

(Method of Using Heat Storage Apparatus)

Figure 3:
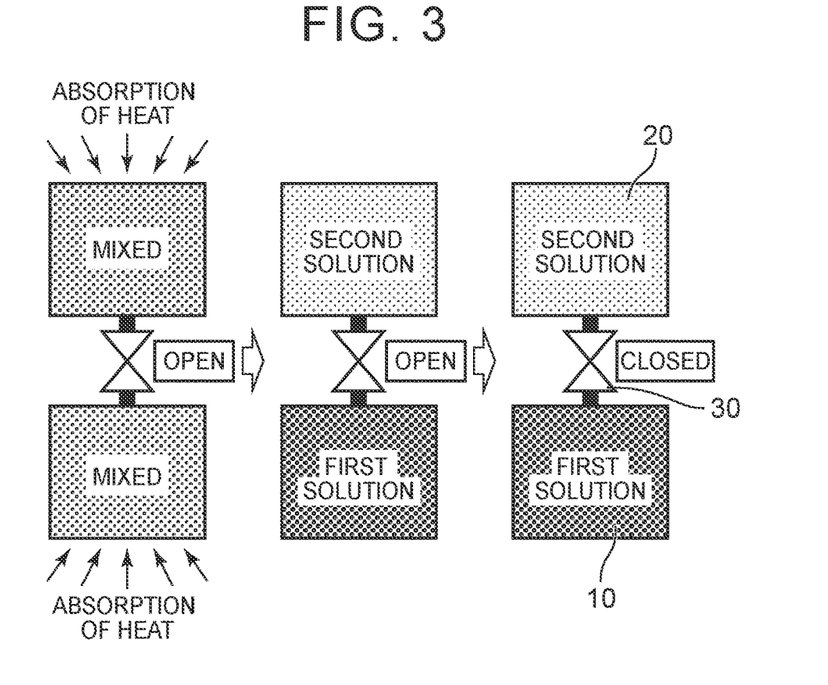
FIG. 3 is a schematic diagram showing a summary of an operation of an on-off valve when heat is stored.
Figure 4:
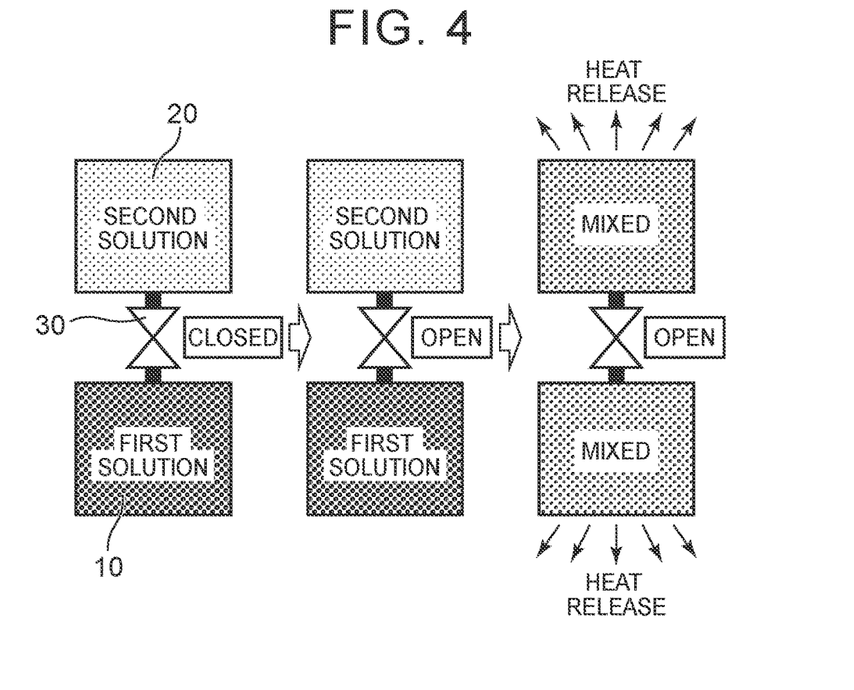
FIG. 4 is a schematic diagram showing a summary of an operation of the on-off valve when a heat storage state is released to start heat release.

A method of using the heat storage apparatus 100 is performed by operating the on-off valve 30. The operation of the on-off valve 30 will be described with reference to the drawings. FIG. 3 is a schematic diagram showing a summary of an operation of the on-off valve 30 when heat is stored. FIG. 4 is a schematic diagram showing a summary of an operation of the on-off valve 30 when the heat storage state is released to start heat release.

As shown in FIG. 3, when the on-off valve 30 is opened at the lower critical solution temperature or higher, the heat storage solution 40 in the state where the first liquid and the second liquid are mixed with each other absorbs heat and separates into the first liquid and the second liquid. The first liquid having a high density is accommodated in the first tank 10, and the second liquid having a low density is accommodated in the second tank 20. At this time, by closing the on-off valve 30, the first liquid and the second liquid are not mixed with each other and heat release is not started even when the heat storage solution 40 is at a temperature lower than the lower critical solution temperature. That is, by closing the on-off valve 30, the heat storage state can be maintained.

As shown in FIG. 4, even when the heat storage solution 40 is at a temperature lower than the lower critical solution temperature, the first liquid and the second liquid are not mixed with each other and the heat storage state is maintained by closing the on-off valve 30. However, by opening the on-off valve 30, the first liquid and the second liquid are mixed with each other and heat release is started. That is, by opening the on-off valve at a temperature lower than the lower critical solution temperature, the heat storage state is released to start heat release.

The heat storage apparatus 100 may further include a configuration described below.

(Heat Release Pipe)

Figure 5:
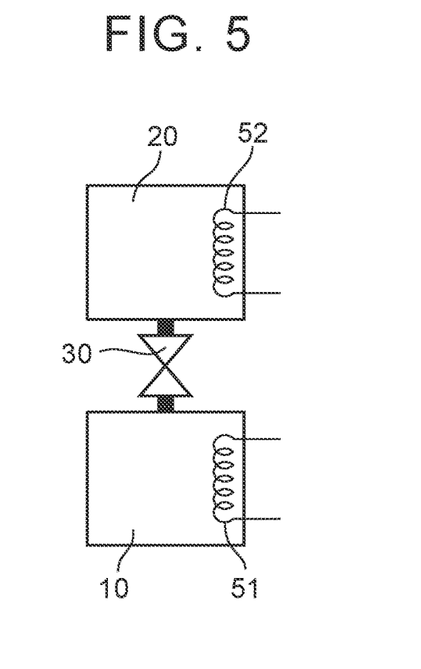
FIG. 5 is a schematic diagram showing an embodiment of the heat storage apparatus according to the disclosure in which a heat release pipe is provided in a first tank and a second tank.

A heat release pipe filled with a heating medium may be provided at least in the first tank 10 or in the second tank 20. FIG. 5 is a schematic diagram showing an embodiment of the heat storage apparatus according to the disclosure in which the heat release pipe is provided in the first tank and the second tank.

In the example shown in FIG. 5, a heat release pipe 51 is provided in the first tank 10, and a heat release pipe 52 is provided in the second tank 20. A position of the first tank 10 where the heat release pipe 51 is provided is not particularly limited. The same shall be applied to the heat release pipe 52.

The heat release pipes 51, 52 are filled with a heating medium (not shown). The heating medium is not particularly limited as long as it is a medium for heating. Examples of the heating medium include water, silicone oil, and a mixture of biphenyl and phenyl ether.

As shown in FIG. 5, a portion of the heat release pipe 51 extends to the outside of the first tank 10. The heat release pipe 51 which extends to the outside of the first tank 10 is connected to a heating object (not shown). The same shall be applied to the heat release pipe 52. As a result, the heating object at a distance from the heat storage apparatus 100 can be heated. Examples of the heating object include a battery of a hybrid vehicle.

(Heat Absorption Pipe)

Figure 6:
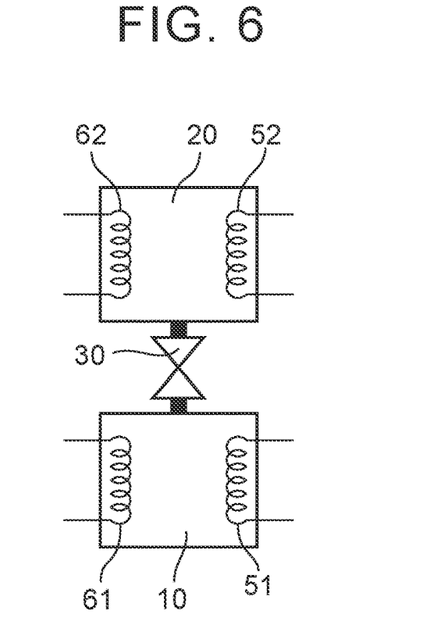
FIG. 6 is a schematic diagram showing an embodiment of the heat storage apparatus according to the disclosure in which a heat release pipe and a heat absorption pipe are provided in a first tank and a second tank.

A heat absorption pipe filled with a heating medium may be provided at least in the first tank 10 or in the second tank 20. FIG. 6 is a schematic diagram showing an embodiment of the heat storage apparatus according to the disclosure in which the heat release pipe and the heat absorption pipe are provided in the first tank and the second tank.

In the example shown in FIG. 6, a heat absorption pipe 61 is provided in the first tank 10, and a heat absorption pipe 62 is provided in the second tank 20. A position of the first tank 10 where the heat absorption pipe 61 is provided is not particularly limited. The same shall be applied to the heat absorption pipe 62. In this example, the heat release pipes 51, 52 are provided. However, only the heat absorption pipes 61, 62 may be provided.

The heat absorption pipes 61, 62 are filled with a heating medium (not shown). The heating medium is not particularly limited as long as it is a medium for heating. Examples of the heating medium include water, silicone oil, a mixture of biphenyl and phenyl ether.

As shown in FIG. 6, a portion of the heat absorption pipe 61 extends to the outside of the first tank 10. The heat absorption pipe 61 which extends to the outside of the first tank 10 is connected to a heat source (not shown). The same shall be applied to the heat absorption pipe 62. As a result, heat can be absorbed from the heat source at a distance from the heat storage apparatus 100. Examples of the heat source include an internal combustion engine of a hybrid vehicle.

Figure 7:
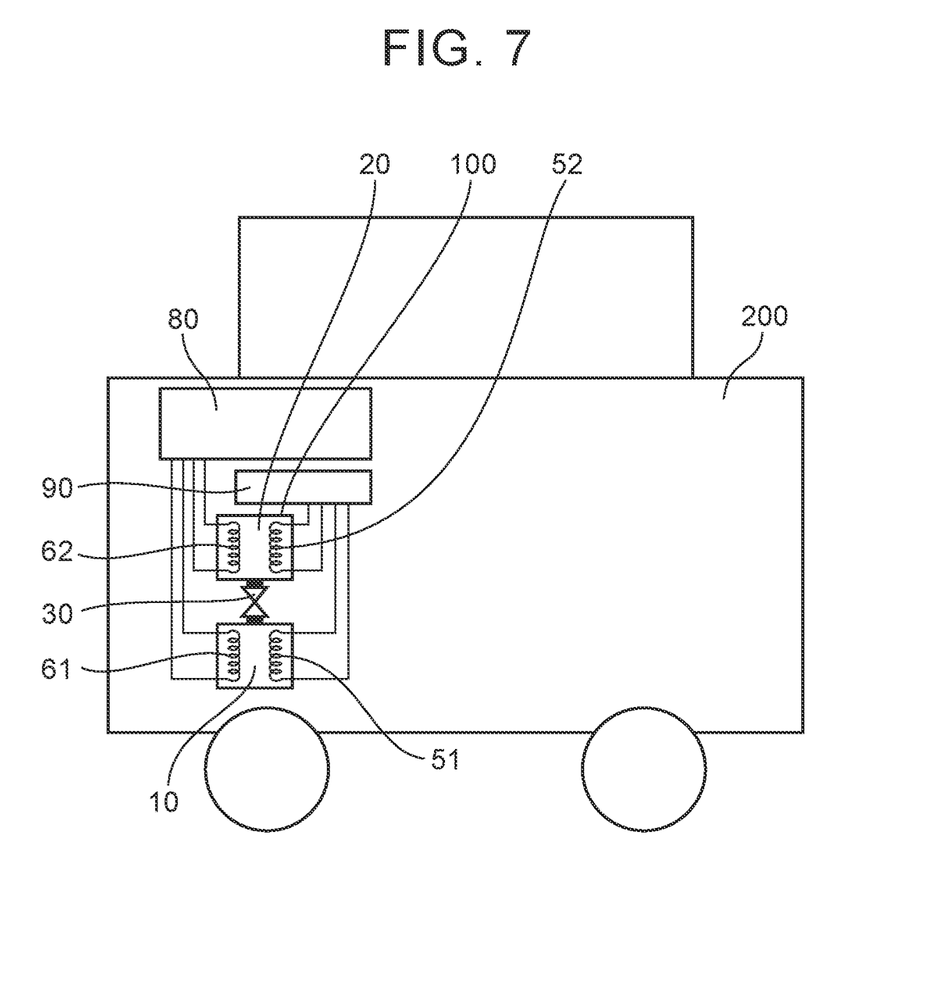
FIG. 7 is a schematic diagram showing an embodiment in which the heat storage apparatus according to the disclosure is applied to a hybrid vehicle.

FIG. 7 is a schematic diagram showing an example in which the heat storage apparatus 100 is applied to a hybrid vehicle. Reference numeral 200 represents a hybrid vehicle.

The hybrid vehicle 200 includes an internal combustion engine 80, a battery 90, and the heat storage apparatus 100.

The heat release pipes 51, 52 are connected to the battery 90, and the heat absorption pipes 61, 62 are connected to the internal combustion engine 80.

In a case where the hybrid vehicle 200 starts in, for example, a cold region, the battery 90 is warmed up through the heat release pipes 51, 52 by opening the on-off valve 30. While the hybrid vehicle 200 is being driven by the internal combustion engine 80, the heat storage apparatus 100 stores heat through the heat absorption pipes 61, 62. By closing the on-off valve 30 during driving, the battery 90 can be warmed up by the heat storage apparatus 100 when the hybrid vehicle 200 starts at the next time in a cold region.

Hereinafter, the embodiments of the disclosure will be described in more detail using Examples. The disclosure is not limited to conditions used in the following Examples.

Example

As a first liquid, a tetra-n-butylphosphonium trifluoromethanesulfonyl leucine aqueous solution (hereinafter, abbreviated as "leucine aqueous solution") was prepared. As a second liquid, water was used.

The density of the leucine aqueous solution was 1.04 g/cm$^3$. The density of water was 1.00 g/cm$^3$. The lower critical solution temperature of the leucine aqueous solution and water was 22° C.

When 1 cm$^3$ of the leucine aqueous solution and 1 cm$^3$ of water were put into one container at 20° C., both of the liquids were mixed with each other, and a mixed solution was obtained.

This mixed solution was accommodated in the first tank 10 and the second tank 20 of the heat storage apparatus 100 shown in FIG. 1. The volumes of the first tank 10 and the second tank 20 were 1 cm$^3$ and 1 cm$^3$, respectively.

The heat storage apparatus 100 accommodating the mixed solution was heated until the temperature of the mixed solution reached 80° C. During heating, the on-off valve 30 was opened.

When the temperature of the mixed solution was 22° C. or higher, the mixed solution separated into the leucine aqueous solution and water. The leucine aqueous solution having a density of 1.04 g/cm$^3$ was accommodated in the first tank 10 provided below the second tank 20. On the other hand, water having a density of 1.00 g/cm$^3$ was accommodated in the second tank 20 provided above the first tank 10. The separated state was maintained until the temperatures of the leucine aqueous solution and water reached 80° C.

The on-off valve 30 was closed in a state where the leucine aqueous solution was accommodated in the first tank 10 and water was accommodated in the second tank 20. The heat storage apparatus 100 was cooled until the temperatures of the leucine aqueous solution and water was 20° C. or lower.

It was verified that, when the on-off valve 30 was opened after cooling, the leucine aqueous solution and water was mixed with each other, the mixed solution was obtained again, and this mixed solution released heat.

The amount of heat of mixing of the leucine aqueous solution and water was measured using a thermal analyzer. As the thermal analyzer, TAM-III (manufactured by TA Instruments Inc.) was used.

Figure 8:
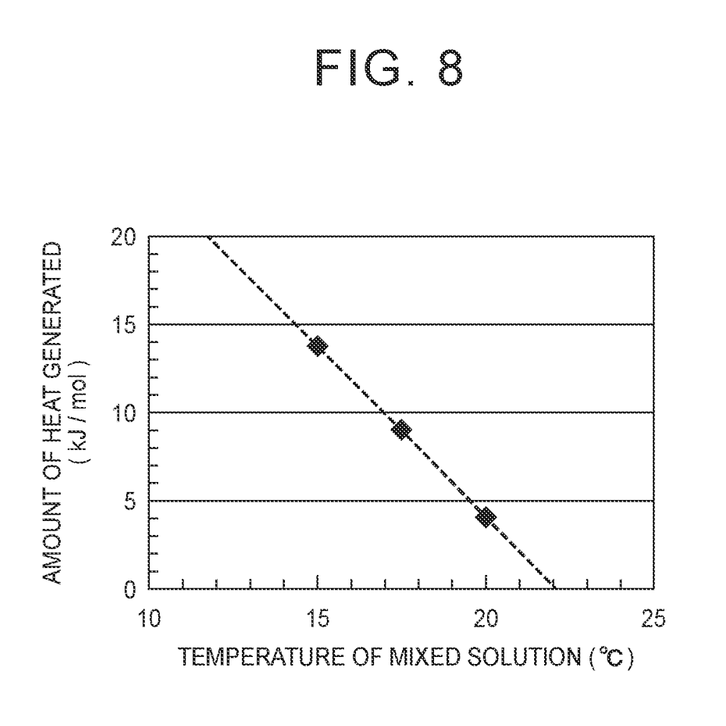
FIG. 8 is a graph showing a relationship between a temperature of a mixed solution and the amount of heat generated in regard to mixing of a tetra-n-butylphosphonium trifluoromethanesulfonyl leucine aqueous solution and water.

The measurement results are shown in FIG. 8. FIG. 8 is a graph showing a relationship between a temperature of a mixed solution and the amount of heat generated in regard to mixing of the leucine aqueous solution and water.

As can be seen from FIG. 8, when the leucine aqueous solution and water are mixed with each other at a temperature lower than the lower critical solution temperature, the mixed solution generates heat. It can also be seen that, as the temperature of the mixed solution decreases, the amount of heat generated increases.

Reference Example 1

1 cm$^3$ of the leucine aqueous solution and 1 cm$^3$ of water were put into the heat storage apparatus 100 at 25° C. While the on-off valve 30 was opened, the temperature of the solution in the first tank 10 and the second tank 20 was maintained at 25° C. for 10 hours. The volumes of the first tank 10 and the second tank 20 were 1 cm$^3$ and 1 cm$^3$, respectively.

It was verified that the leucine aqueous solution and water were not mixed with each other in a state of being separately accommodated in the first tank and the second tank, respectively. As a result, it was verified that, in a case where water and the leucine aqueous solution are used in combination, the state where the leucine aqueous solution and water are separated from each other can be maintained by maintaining the temperature at the lower critical solution temperature or higher.

Reference Example 2

As a first liquid, water was used. As a second liquid, ethanol was used. The density of water was 1.00 g/cm$^3$. The density of ethanol was 0.789 g/cm$^3$.

When 1 cm$^3$ of water and 1 cm$^3$ of ethanol were mixed with each other at 20° C., both of the liquids were mixed with each other, and a mixed solution was obtained.

This mixed solution was accommodated in the first tank 10 and the second tank 20 of the heat storage apparatus 100 shown in FIG. 1. The volumes of the first tank 10 and the second tank 20 were 1 cm$^3$ and 1 cm$^3$, respectively.

The heat storage apparatus 100 accommodating the mixed solution was heated until the temperature of the mixed solution reached 80° C. During heating, the on-off valve 30 was opened.

Even when the temperature of the mixed solution was increased, the mixed solution did not separate into water and ethanol. This mixed solution was boiled at 80° C. As a result, it can be seen that, in a case where water and ethanol are used in combination, there is no lower critical solution temperature.

Based on the above results, the effects of the embodiments of the disclosure were able to be verified.

What is claimed is:

1. A heat storage apparatus comprising:
    a first tank;
    a second tank that is provided above the first tank;
    an on-off valve having one end connected to an upper portion of the first tank and having another end connected to a lower portion of the second tank;
    a heat storage solution that is accommodated in the first tank and the second tank, wherein
        the heat storage solution has a characteristic of absorbing heat and separating into a first liquid and a second liquid having a lower density than the first liquid at a lower critical solution temperature or higher, the first liquid and the second liquid have a characteristic of releasing heat and mixing with each other at a temperature lower than the lower critical solution temperature, and when the heat storage solution separates into the first liquid and the second liquid, the first liquid is accommodated in the first tank and the second liquid is accommodated in the second tank; and
    the first liquid is a tetra-n-butylphosphonium trifluoromethanesulfonyl leucine aqueous solution and the second liquid is water.

2. The heat storage apparatus according to claim 1, wherein
    a heat release pipe filled with a heating medium is provided at least in the first tank or in the second tank.

3. The heat storage apparatus according to claim 1, wherein
    a heat absorption pipe filled with a heating medium is provided at least in the first tank or in the second tank.

4. The heat storage apparatus according to claim 2, wherein
    the heat release pipe is connected to a battery of a hybrid vehicle.

5. The heat storage apparatus according to claim 3, wherein
    the heat absorption pipe is connected to an internal combustion engine of a hybrid vehicle.

6. A method of using the heat storage apparatus according to claim 1, the method comprising:
    a) opening the on-off valve at the lower critical solution temperature or higher to obtain a heat storage state in which the first liquid is accommodated in the first tank and the second liquid is accommodated in the second tank, and then closing the on-off valve to maintain the heat storage state; and
    b) opening the on-off valve at the temperature lower than the lower critical solution temperature such that the heat storage state is changed to start heat release.

* * * * *